Figure 1:
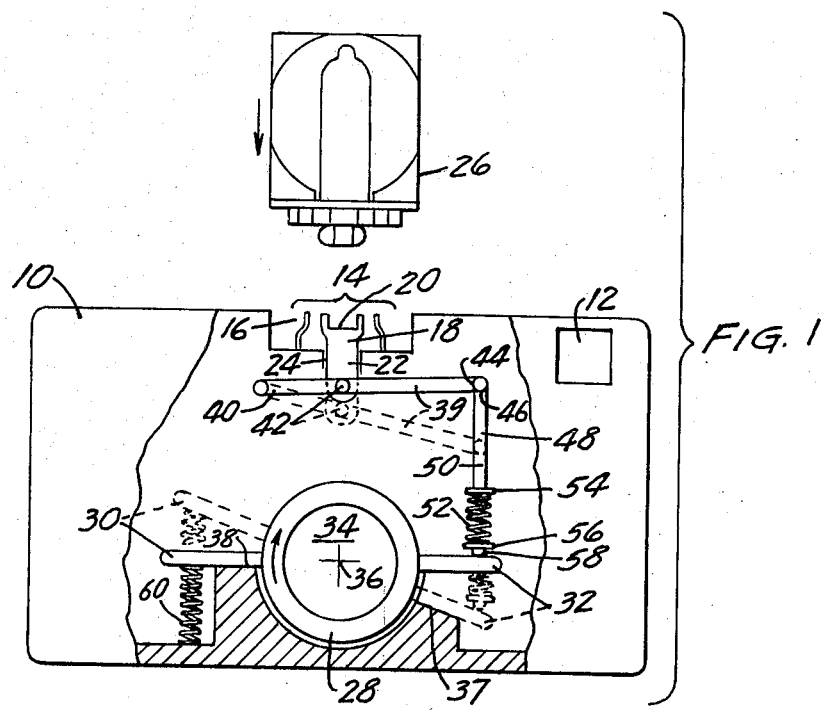

United States Patent
Monachesi

[15] 3,643,577
[45] Feb. 22, 1972

[54] CAMERA HAVING FOCUS ADJUSTMENT ASSEMBLY

[72] Inventor: Paolo Monachesi, Carcare, Italy
[73] Assignee: Societa' Per Azioni Ferrania
[22] Filed: Apr. 1, 1969
[21] Appl. No.: 811,885

[30] Foreign Application Priority Data
Apr. 4, 1968 Italy..........................................15,957

[52] U.S. Cl..................................................95/45, 95/11 L
[51] Int. Cl. .................................................G03b 3/00
[58] Field of Search........................................95/45, 11, 11 L

[56] References Cited

UNITED STATES PATENTS 3,048,092  8/1962  Gottschalk.................................95/45

FOREIGN PATENTS OR APPLICATIONS 1,065,137  4/1967  Great Britain............................95/11
1,037,503  6/1966  Great Britain..........................95/11 L Primary Examiner—Samuel S. Matthews
Assistant Examiner—Richard L. Moses
Attorney—Kinney, Alexander, Sell, Steldt & Delahunt

[57] ABSTRACT

A camera is shown having a focus adjustment assembly, a focusing lens having a principal axis, and a support for attachment of an illumination device to the camera. The focus adjustment assembly causes the focusing lens to traverse its principal axis between near and distant focusing positions in response respectively to attachment to or removal from the camera of the illumination device.

7 Claims, 1 Drawing Figure

PATENTED FEB 22 1972

3,643,577

INVENTOR.
PAOLO MONACHESI
BY Kinney, Alexander,
Sell, Steldt & De La Hunt
ATTORNEYS

CAMERA HAVING FOCUS ADJUSTMENT ASSEMBLY

Popular, lower priced still and movie cameras are generally provided with fixed-focus lenses which permit sharp pictures to be taken of objects at a distance from the camera of from several meters to infinity. This focus setting is useful when outdoor views are photographed. Objects which are photographed indoors with the aid of artificial illumination, however, are normally located nearer the camera, e.g., at a distance from the camera of from about 1 to 3 meters. Fixed-focus cameras often are unable to sharply focus on such near objects, and the resultant photographs of such objects appear blurred.

This problem has been partially overcome with cameras having an auxiliary focusing lens which can be swung from an inoperative position into the focal path of the camera in response to attachment to the camera of an illumination device (i.e., a flashbulb), thereby bringing objects near to the camera into sharp focus. Such cameras are disclosed in U.S. Pat. No. 3,373,671 (F. Jacob, issued Mar. 19, 1968). This arrangement, however, requires the auxiliary lens to be precisely and carefully aligned with the objective lens assembly to avoid distortion of the image. The position of the auxiliary lens is consequently highly dependent upon the exact positioning of the flashbulb when it is attached to the camera, and is subject to being jarred out of perfect alignment with the objective lens during normal usage of the camera.

The present invention provides a camera wherein a focusing lens is traversed along its principal axis from a distant focusing position to a near focusing position in response to attachment of an illumination device, thereby avoiding the distortion which results from imperfect alignment of lens elements of the previously discussed cameras. The lens elements of the camera of the present invention remain in alignment regardless of the focus of the camera and are not easily jarred out of position.

Briefly, the present invention provides a variable-focus camera comprising a case; a lens housing movably attached to the case; a focusing lens having a principal axis and being mounted in and axially carried by the lens housing along the principal axis between near and distant focusing positions in response to movement of the housing between respective first and second positions; and a support carried by the case for attachment thereto of an illumination device. The camera is characterized by focus adjustment means responsive to the attachment of the illumination device to physically position the focusing lens in the near focusing position. The focus adjustment means comprises a. a movable member operatively coupled to the support, the movable member being displaced in response to attachment of an illumination device to the support; and b. motion-transmitting means operatively coupling the movable member and the lens housing to physically move the lens housing into the first position in response to displacement of the movable member by attachment of the illumination device to the support.

By "focusing lens" herein is meant one or more lens elements which are carried by the lens housing between near and distant focusing positions to change the focus of the camera. In the most simple cameras, the focusing lens may constitute a single lens element which may be the only lens in the camera. In more sophisticated cameras, the focusing lens may consist of a plurality of lens elements (e.g., an achromatic lens).

By "illuminating device" herein is meant a device which may be attached to a camera to provide artificial illumination e.g., for indoor or nighttime photography. Illumination devices include flashbulbs, flashbulb holders, flood lights, flood light holders, and the various cables and connections which are used to operatively connect or synchronize an illumination source with a camera.

In a preferred embodiment, the motion-transmitting means of the camera of the present invention includes a resilient member through which motion of the movable member is transmitted to the lens housing. The resilient member preferably coacts with the movable member and the lens housing to move the housing into the first (near focusing) position upon only partial but operatively sufficient attachment (herein termed "operative" attachment) of an illumination device to the camera, thereby avoiding the possibility of affecting only partial movement of the lens housing upon careless attachment of an illumination device to the camera. After attachment of the illumination device, the resilient member resiliently holds the lens housing in the first position, thereby maintaining accurate focusing when the camera or illumination device is bumped or jarred in normal use. The camera is preferably also provided with an elastic biasing element which urges the lens housing into the second (distant focusing) position upon removal of the illumination device.

In the accompanying drawing:

FIG. 1 is a front elevational view of a still camera of the present invention, the camera case being partially broken away and in partial cross section.

Referring to FIG. 1, a still camera is provided with a case 10 and a viewfinder 12. The case is provided with a support 14 having a flashbulb socket 16 and a movable member (shown as plunger 18). The plunger 18 has a flashbulb-engagable top portion 20 and a lower portion 22 which slidably engages a vertical guide portion 24 of the camera case such that said plunger is depressed upon insertion of a flashbulb 26 into the support 14.

A lens housing 28 having radial projections (shown as spokes 30 and 32) and containing a focusing lens 34 is rotatably attached to the case 10 by means of helical threads (not shown) such that rotation of the lens housing about the principal axis 36 of the focusing lens causes the lens housing to carry the focusing lens along said principal axis 36 (perpendicular to the plane of the drawing), thereby changing the focus of the camera. The case 10 is provided with ledges 37 and 38 which are contactable with and limit the travel respectively of spokes 32 and 30 such that said focusing lens is in a near focusing position when spoke 32 bears upon ledge 37 and is in a distant focusing position when spoke 30 bears upon ledge 38.

A lever 39 is pivotally attached at one end 40 to said case 10 and is attached at a point 42 along its length to the lower portion 22 of the plunger 18. At its other end 44 the lever 39 is attached to the upper end 46 of rod 48, the lower end 50 of which rod is operatively coupled to the lens housing spoke 32 through a resilient member (shown as spring 52). Preferably, the lower end 50 of the rod 48 is rigidly attached to the upper portion 54 of the spring 52, the lower portion 56 of which spring has a nub 58 which bears upon the spoke 32. The other spoke 30 is attached to the case 10 by an elastic biasing element (shown as spring 60) which tends to urge rotation of the lens housing 28 in a direction opposite to that shown by the arrow.

In operation, insertion of a flashbulb 26 into the socket 16 causes depression of the plunger 18 which in turn coacts with the motion-transmitting means (lever 39, rod 48, spring 52 and spoke 32) to rotate the lens housing 28 in the direction shown by the arrow against the biasing effect of spring 60, thereby moving the lens 34 along its principal axis 36 into the near focusing position. The relative positions of the plunger 18, lever 39, rod 48, springs 52 and 60 and spokes 30 and 32 when the focusing lens 34 is in the near focusing position are shown by the dashed lines in the drawing. Upon removal of the flashbulb 26, spring 60 urges the lens housing 28 to rotate in the opposite direction and return the focusing lens 34 to the distant focusing position.

It should be understood that the present invention, although described herein primarily by reference to still cameras, applies as well to other cameras such as movie cameras.

In another embodiment (not shown), a nonrotating lens housing may be employed to carry the focusing lens along its principal axis. For example, the motion-transmitting means may include a camming member for camming the lens housing along the principal axis of the focusing lens to carry the focusing lens into the near focusing position. The motion-transmitting means may also be conveniently adapted to govern the position of the focusing lens in common bellows-type cameras.

I claim:

1. A variable-focus camera comprising a case; a lens assembly comprising a lens housing movably attached to said case and a focusing lens having a principal axis and coaxially mounted in said housing, said lens being axially carried along its principal axis between near and distant focusing positions in response to movement of said housing between respective first and second positions; a support carried by said case for attachment thereto of an illumination device; and a focus adjustment assembly responsive to the attachment of said illumination device to physically position said focusing lens in said near focusing position, said adjustment assembly comprising a. a movable member operatively coupled to said support, said member being displaced in response to attachment to said support of an illumination device; and
   b. motion-transmitting means including a resilient member, said motion-transmitting means coupling said movable member through said resilient member to said housing to physically move said housing into said first position in response to displacement of said movable member by attachment of said illumination device to said support.

2. The camera of claim 1 wherein said focus adjustment assembly additionally comprises an elastic biasing element positioned within said case to normally elastically restrain said housing in said second position.

3. The camera of claim 1 wherein said motion-transmitting means is positioned in coacting relationship with said movable member and said lens housing to physically move said housing into said first position in response to operative attachment of said illumination means to said support.

4. A variable-focus camera comprising a case; a lens assembly comprising a lens housing movably attached to said case and a focusing lens mounted in said housing and having a principal axis, said lens being axially carried along its principal axis between near and distant focusing positions in response to movement of said housing between corresponding first and second positions; a support carried by said case for attachment thereto of an illumination device; and a focus adjustment assembly responsive to the attachment to and the removal from said support of said illumination device to respectively physically position said focusing lens in said near and distant focusing positions, said adjustment assembly comprising a. an elastic biasing element positioned within said case to normally elastically restrain said housing in said second position;
   b. a movable member operatively coupled to said attachment support and positioned to be displaced by attachment to said support of said illumination device,
   c. motion-transmitting means including a resilient member, said motion-transmitting means coupling said movable member to said housing through said resilient member to physically move said housing against said elastic restraint into said first position in response to displacement of said movable member by attachment of said illumination device.

5. A variable-focus camera comprising a case; a lens assembly comprising a lens housing rotatably attached to said case and a focusing lens having a principal axis, said focusing lens being mounted in and axially carried by said housing along said principal axis between near and distant focusing positions in response to rotation of said housing about said principal axis between corresponding first and second positions; a support carried by said case for attachment thereto of an illumination device; and a focus adjustment assembly to physically position said focusing lens in said near or distant focusing positions in response to respective attachment or removal of said illumination device, said focus adjustment assembly comprising;

a. a movable member operatively coupled to said attachment support and positioned to be displaced in response to attachment of said illumination device;
   b. an elastic biasing element positioned within said case to normally elastically restrain said housing in said second position; and
   c. motion-transmitting means including a resilient member, said motion-transmitting means coupling said movable member to said housing through said resilient member to physically move said housing against the restraint of said elastic biasing element into said first position in response to displacement of said movable member by attachment of said illumination device.

6. The camera of claim 5 wherein said lens housing has a plurality of projections extending outwardly therefrom, said elastic biasing element being operatively coupled to one of said projections to normally urge rotation of said housing into said second position, and said resilient member of said motion-transmitting means being operatively coupled to another of said projections to afford rotation of said housing into said first position in response to attachment of said illumination device.

7. A variable-focus camera comprising a case; a lens assembly comprising a lens housing rotatably attached to said case and a focusing lens having a principal axis and coaxially mounted in said housing, said focusing lens being axially carried by said housing along said principal axis between near and distant focusing positions in response to rotation of said housing about said principal axis; a support carried by said case for attachment thereto of an illumination device; and a focus adjustment assembly to physically position said focusing lens in said near or distant focusing position in response respectively to attachment or removal of said illumination device, said focus adjustment assembly comprising a. a pair of spokes attached to said lens housing and extending radially outward therefrom;
   b. an elastic biasing element operatively attached to one of said spokes and positioned to urge rotation of said housing in a direction to carry said focusing lens into said distant focusing position; and
   c. motion-transmitting means including a resilient body, said means operatively coupling said movable member of said support through said resilient body to the other of said spokes to physically rotate said housing in a direction to carry said focusing lens into said near focusing position in response to attachment of said illumination device.

* * * * *